United States Patent
Celi et al.

(10) Patent No.: US 9,471,302 B1
(45) Date of Patent: Oct. 18, 2016

(54) MANAGING UPDATES TO DIFFERENT COMPUTER PROGRAMS

(71) Applicant: International Business Machines Corporation, Armonk, NY (US)

(72) Inventors: Joseph Celi, Boca Raton, FL (US); Bharat B Purohit, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/838,243

(22) Filed: Aug. 27, 2015

(51) Int. Cl.
*G06F 9/44* (2006.01)
*G06F 9/445* (2006.01)

(52) U.S. Cl.
CPC .. *G06F 8/65* (2013.01); *G06F 8/70* (2013.01)

(58) Field of Classification Search
CPC .............. G06F 8/65; G06F 8/67; G06F 8/68; G06F 8/70
USPC ................................................. 717/168, 169
See application file for complete search history.

(56) References Cited

U.S. PATENT DOCUMENTS

| 8,805,783 | B2* | 8/2014 | Muhunthan | G06F 17/30575 707/626 |
| 2007/0112947 | A1* | 5/2007 | Anderson | H04L 41/5074 709/223 |
| 2011/0295796 | A1* | 12/2011 | Muhunthan | G06F 17/30575 707/610 |
| 2014/0279878 | A1* | 9/2014 | Buerk | G06Q 10/06316 707/611 |

* cited by examiner

*Primary Examiner* — Anna Deng
(74) *Attorney, Agent, or Firm* — Kevin Jordan (57) ABSTRACT

Data updates to a record created under a computer program that involve data values of interest to a different record created under a different computer program can be managed by computing an initial value based on the application of a function (such as a hash or checksum function) to identified data values of interest. A poll can be periodically performed to identify data updates. If an updated record is identified, a current value is computed based on the application of the function to the data values of interest associated with the updated record. The initial value is compared to the current value. If the values are determined to be different, the changes to the updated record are determined to involve changes to the data values of interest and the data values of interest are then transmitted to the different record.

18 Claims, 5 Drawing Sheets

MANAGING UPDATES TO DIFFERENT COMPUTER PROGRAMS

BACKGROUND

The invention relates to the management of data updates to different computer programs and, more specifically, to a computer-implemented method, computer program product and computer system for determining whether a data update to a record created under one computer program involves data of interest to a record created under a different computer program.

Help-desk systems often apply multiple—typically increasing—levels of expertise to resolve problems encountered by users of computer systems. For example, a "level-1" ticket may be created under one problem ticketing application, whereas another "level-2" ticket, which is related to some aspect of the same problem, may be created under a different problem ticketing application.

In many cases, one system or a subsystem thereof may be configured to manage and coordinate multiple problem ticketing applications and underlying problem tickets across an enterprise. It is not unusual for a single ticket integration system to manage twenty or thirty problem ticketing applications (many of which can be different applications) at any given time.

SUMMARY

A computer-implemented method embodying the present invention for managing one or more data updates to different computer programs computes an initial value based on the application of a function to data values contained in an identified subset of data fields associated with a record created under a first computer program, where such data values are of interest to another record created under a different computer program. The initial value generated is representative of the data values of interest and is stored in a memory associated with the record. In some embodiments, the function is a checksum function and the value generated by the application thereof is a checksum. The computer programs are monitored for data updates and a record is identified as an updated record containing said data updates. In some embodiments, the monitoring is performed at predefined time intervals. A current value, which is representative of the data values associated with an identified updated record, is computed based on the application of the aforementioned function to the data values of interest associated with the updated record. The current value is compared to the initial value. If it is determined that the current value and the initial value are not equal, the initial value stored in the memory associated with the record is overwritten with the current value and stored in the memory associated with the record and the data values of interest associated with the updated record are communicated to said another record created under the different computer program.

In some embodiments, the data values of interest associated with the updated record are communicated over a network to another record. In some embodiments, a centralized computer program manager coordinates the computer-implemented method. In some embodiments, the centralized computer program manager is a problem ticketing application manager, the computer program is a problem ticketing application, the different computer program is a different problem ticketing application, the record is a problem ticket created under the problem ticketing application and said another record is different problem ticket created under the different problem ticketing application.

Other embodiments of the present invention are disclosed herein, including system and computer program product embodiments.

DETAILED DESCRIPTION

By way of introduction, the following description will show various aspects, examples and embodiments of the present invention for managing data updates to related records created under different computer applications. Conventional devices, components, techniques and other operational and individual components thereof, understood by one of ordinary skill in the art, may not be described in detail herein. Specifics are in many cases provided merely for ease of explanation and/or understanding the various aspects, examples and embodiments and possible variations thereof. Unless explicitly stated otherwise, references to terms herein are provided as descriptive expedients and should not be construed as a requirement for any particular implementation or physical embodiment. Moreover, aspects of the present invention are applicable to a variety of computer hardware and software configurations.

The term "network" as used herein, includes without limitation, any collection of nodes (terminal and any intermediate nodes) connected by transmission links so as to enable communications between nodes. By way of example only, such networks include but are not limited to telecommunications networks, computer networks (linking computers and other devices), the Internet (a network of networks linking computers worldwide) and telephone networks. Unless explicitly stated otherwise herein, all networks/nodes use conventional, publicly available protocols or messaging services to communicate with each other.

As is known, a network architecture can be considered a framework for the specification of the organization, configuration, and operational principles/procedures of its network components. The architecture of the Internet, however, is sometimes (somewhat differently or loosely) characterized by its network components' use of the Internet Protocol (IP) suite. By way of example only, embodiments of the present invention on the Internet can use conventional TCP/IP protocols to provide message control and routing across the network. A few specific examples of network architectures in accordance with the present invention include, without limitation, client-server architectures and peer-to-peer (P2P) architectures and combinations/variations thereof. By way of further example only, and without limitation: in a client-server architecture, a computer may operate as a server and/or a client device, or as a peer device in a peer-to-peer architecture; and an enterprise service bus ("ESB") architecture (a variant of a client-server architecture), employs a publish/subscribe model to which one or more client applications can subscribe. In an ESB architecture, if an application subscribes to the ESB, content generated or updated by a subscribing application will be published to the ESB and accessible to subscribing applications.

As is known, a computer and/or computer program/application may, and often does, comprise a plurality of computer units, including, without limitation, combinations of subsystems, nodes, devices, subroutines, modules, operations, methods and procedures. In some embodiments, one or more aspects of the present invention may be distributed among a plurality of computers, nodes, processors and/or computer programs/applications. Examples of distributed computing (sometimes referred to as parallel computing) configurations include, but are not limited to a network, cluster, farm, group, grid or cloud of computers that perform collectively through one or more local, remote, wired and/or wireless connections, configurations and combinations thereof. However, merely for ease of understanding, some embodiments of the present invention are more easily understood as part of a client-server architecture on the Internet. By way of example only, a computer server in accordance with the present invention can include a centralized computer program manager, which is configured/adapted to implement various aspects of the present invention.

The terms "computer hardware" or "hardware," as used herein, refers to any machine, device or apparatus that is capable of accepting, performing logic operations on, storing or displaying data, including, without limitation, processors, logic and memory. The terms "computer," "machine," "device," "system," "server, "client," "node" and combinations and/or variations thereof as used herein, include without limitation, any combination of one or more of hardware, software and firmware useful to perform an operation. The term "processor(s)" as used herein include, without limitation, one or a combination of general or special purpose processors, microprocessors, co-processors, graphics processors, and digital signal processors, which along with other hardware, memory and software/firmware, e.g., as part of a system, perform the operations described herein. The terms "computer software," "software," "firmware," "computer program," "program," "computer application," "application" and the like, as used herein, refer to any set of computer readable instructions (and any related data) operable to cause a computer to perform an operation, including without limitation, create, access, perform logic operations on, store, or display data. The term "logic" as used herein includes but is not limited to hardware, electronic circuitry, software/firmware embedded within processor(s) or other devices configurable to perform certain operations.

The term "memory," as used herein, includes without limitation any centralized, shared or distributed computer-readable (volatile or persistent) storage medium/media in which a computer can store data or software for any duration. A few specific examples of memory include, without limitation: a magnetic disk; an optical disk; an electrical circuit; a random-access memory (RAM); a read-only memory (ROM); an erasable programmable read-only memory (EPROM); a memory stick; a buffer, flash or cache memory; a centralized or distributed data store; server storage; or any suitable combination of the foregoing. The term "computer program product" as used herein, includes, without limitation, any combination of memory with stored software for causing a processor to perform certain operations.

The term "different" as used herein with regard to computer programs, includes without limitation, a record created under a computer program, where one or more of the interfaces to, formats, data fields and/or internal operations thereof, are not the same as those of another record created under another computer program. By way of example only, a non-exhaustive list of different problem ticketing applications includes, without limitation: the Parature CRM (Customer Relationship Management) software application, available from Microsoft Corporation; and the Bugzilla software application, available from the Mozilla Foundation. Problem ticket applications are sometimes referred to as or can be a part of customer relationship management (CRM), problem reporting, help-desk, service-desk, issue tracking or bug tracking applications.

The term "related," as used herein with regard to records created under computer programs includes, without limitation, records that involve some common data such that certain changes/updates to information associated with a record are data of interest to another record.

In some embodiments of the present invention, a computer system/server is referred to as a ticket integration server and a centralized computer program manager is referred to as a problem ticket application manager or ticket synch manager. The centralized computer program manager can be configured/adapted, in accordance with some embodiments of the present invention, to manage updates to records created under managed computer programs, such as by facilitating coordination and communication of data updates to problem tickets created under different problem ticket applications.

The term "function" as used herein with regard to function FN (FIG. 1), refers to a function that when applied to data (sometimes referred to as a message), generates a computed value representative of the data. In some embodiments (discussed in more detail below), function FN refers to a checksum function. A non-exhaustive list of such checksum functions includes, without limitation: a modular sum function, a position-dependent checksum or one of the n-bit CRC family of cyclic redundancy check ("CRC") functions. In some embodiments, the data to which the function FN is applied refers to data contained in a subset of the data fields of a record created under one computer program, where such data is identified as data of interest (sometimes referred to as DOI) to a related record created under a different computer program. Although a checksum function is described with reference to some examples herein, any function suitable to compute values representative of data of interest can be adapted and used. A non-exhaustive list of such functions include, without limitation: hash functions, such as hash tables and trivial hash functions; message digest ("MD") algorithms such as "MD5"; cryptographic hash functions such as the well-known secure hash algorithm ("SHA") family of cryptographic hash functions; and cryptographic authentication mechanisms, which employ message authentic codes (MACs) or digital signatures, if authentication is desired.

The term "computed value" as used herein refers to the results of the application of function FN (FIG. 1) to DOI. By way of overview and without limitation, a computed value that is generated after updates to a problem ticket have been generally identified is sometimes referred to as a current value or a DOIcurrentVal (see e.g., FIG. 3, 21011TV), whereas a computed value that is generated prior to such general identification of updates, it may be referred to as an initial value, a recently computed value or a DOILastVal (see e.g., FIG. 2A, 11011TV). Similarly, problem ticket 110n1 can include a data field (not depicted) for storing a computed value that represents DOI to a related problem ticket (not depicted).

Although some embodiments of the present invention are described in the context of different problem ticketing applications, the present invention should not be construed as so limited. Rather, the present invention is to be understood as generally applicable to the management of data updates to a record created using a first computer program that involve data of interest to related record created using a different computer program.

Figure 1:
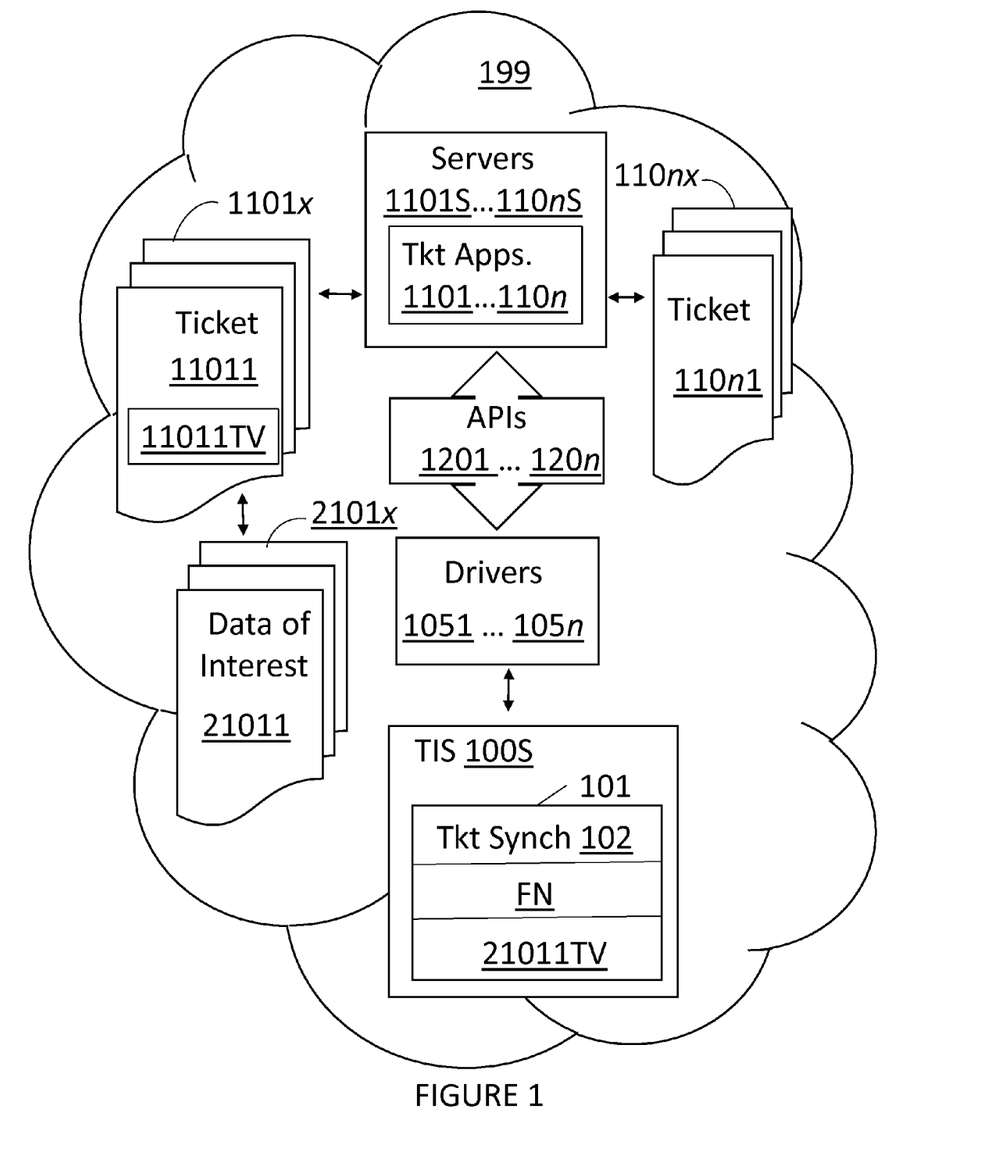
FIG. 1 illustrates an example of a computer system in accordance with the present invention.

With reference now to FIG. 1, a computer system embodiment of the present invention in a client-server architecture is depicted. In this example, network 199 is the Internet, the components of which are communicatively coupled through network 199 and (individually or collectively) may be configured/adapted to perform one or more features, operations or methods of the present invention. As depicted, computer servers 1101S . . . 110nS are executing problem ticketing applications 1101 . . . 110n. As is known, each problem ticketing application manages the lifecycle of problem tickets created under the application. For example, problem ticketing application 1101 manages problem tickets 11011 . . . 1101x and problem ticketing application 110n manages problem tickets 110n1 . . . 1101nx. Also as is known, problem tickets can be retained in a conventional persistent, read-write capable data store (not depicted) and are accessible through clients (not depicted) by assigned help-desk support personnel.

Referring again to FIG. 1, Ticket integration system/server ("TIS") 100S includes memory 101 in which computer executable program code and data can be stored for execution on TIS 100S. TIS 100S is communicatively coupled through respective TIS Drivers 1051 . . . 105n and APIs 1201 . . . 120n to servers 1101S . . . 110nS. The ticketing applications 1101 . . . 110n are executing on the respective servers 1101S . . . 110nS. As is known, drivers (1051 . . . 105n) are generally responsible for managing communications between TIS 100S and the respective problem ticketing applications 1101 . . . 110n via respective APIs 1201 . . . 120n. A few examples, without limitation, of such APIs are a REST API and a client-server Java API.

As depicted, ticket synch 102 computer program/problem ticket application manager and function FN reside in memory 101. Function FN is communicatively coupled to ticket synch 102 manager. Ticket synch 102 manager provides a conventional centralized management of problem tickets 11011 . . . 1101x and 110n1 . . . 110nx, including management of data updates to the problem tickets created under problem ticketing applications 1101 . . . 110n. As is known, problem tickets 11011 . . . 1101x and 110n1 . . . 110nx can contain many data fields. In this example, two of the problem ticketing applications 1101 and 110n are different problem ticketing applications and problem ticket 11011 (created under problem ticketing application 1101) is related to problem ticket 110n1 (created under problem ticketing application 110n). Also in this example, data contained in data of interest data fields 21011 (also referred to as "DOI") refers to data contained in a subset of the data fields associated with problem ticket 11011 that is DOI to related problem ticket 110n1.

Also as depicted, problem ticket 11011 includes data field 11011TV, and memory 101 includes data field 21011TV. As will be discussed in more detail in the examples below, each of data fields 11011TV and 21011TV can be adapted for storing a computed value generated by the application of function FN to DOI 21011 to related problem ticket 110n1.

By way of example only, with reference again to FIG. 1, and without limitation, we will assume that: a lowest severity ("severity 3") problem ticket 11011 is initially opened (status="OPEN") by "level-1" help desk support personnel (not depicted) using problem ticket application 1101; the severity of the underlying problem is subsequently increased to "severity 2"; and another, related problem ticket 110n1 is opened (status="OPEN") under different problem ticket application 110n for handling by "level-2" help desk support personnel. In this example, we will assume that an update to problem ticket 11011 is subsequently detected and ticket synch 102 manager retrieves the DOI from updated ticket 11011 and applies function FN to the retrieved DOI to generate a current value, which is representative of the retrieved DOI. The current value can be stored in data field 21011TV and subsequently compared to the initial value stored in data field 11011TV. We will also assume that the change (such as a status change) is DOI to the related problem ticket, in which case: the computed values (the current value and the initial value) will not be equal; the updated problem ticket 11011 can be considered as involving DOI to the related problem ticket 110n1; and the DOI can be communicated for incorporation or reference in the related problem ticket 110n1.

Thus, some aspects of the present invention can increase overall system throughput by identifying updates to data of interest—without having to store persistent copies of and run a full comparison of data created under a computer program with a prior version of data created under the same computer program. Some aspects of the present invention can also reduce unnecessary network/system traffic by first identifying whether data updates involve data that is of interest to related material created under a different computer program, before initiating such traffic.

Figure 2A:
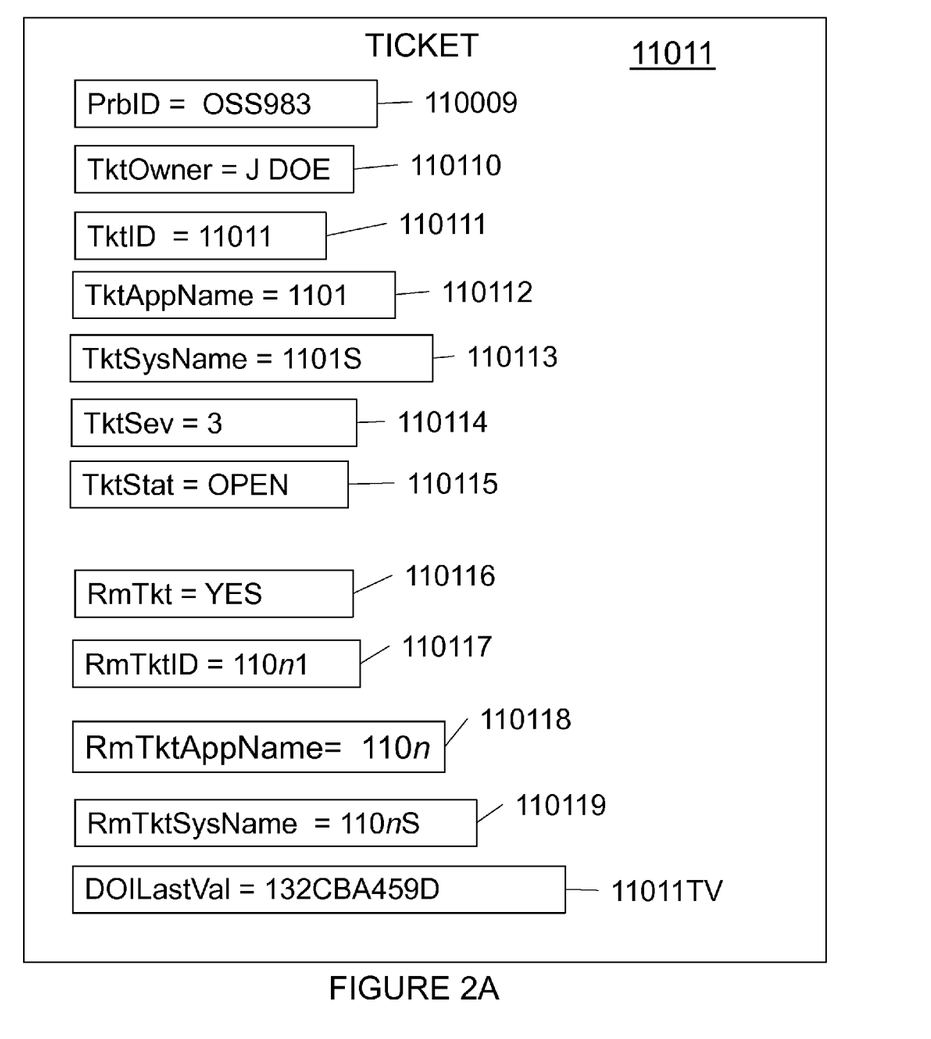
FIG. 2A illustrates a further example of a problem ticket depicted in FIG. 1
Figure 2B:
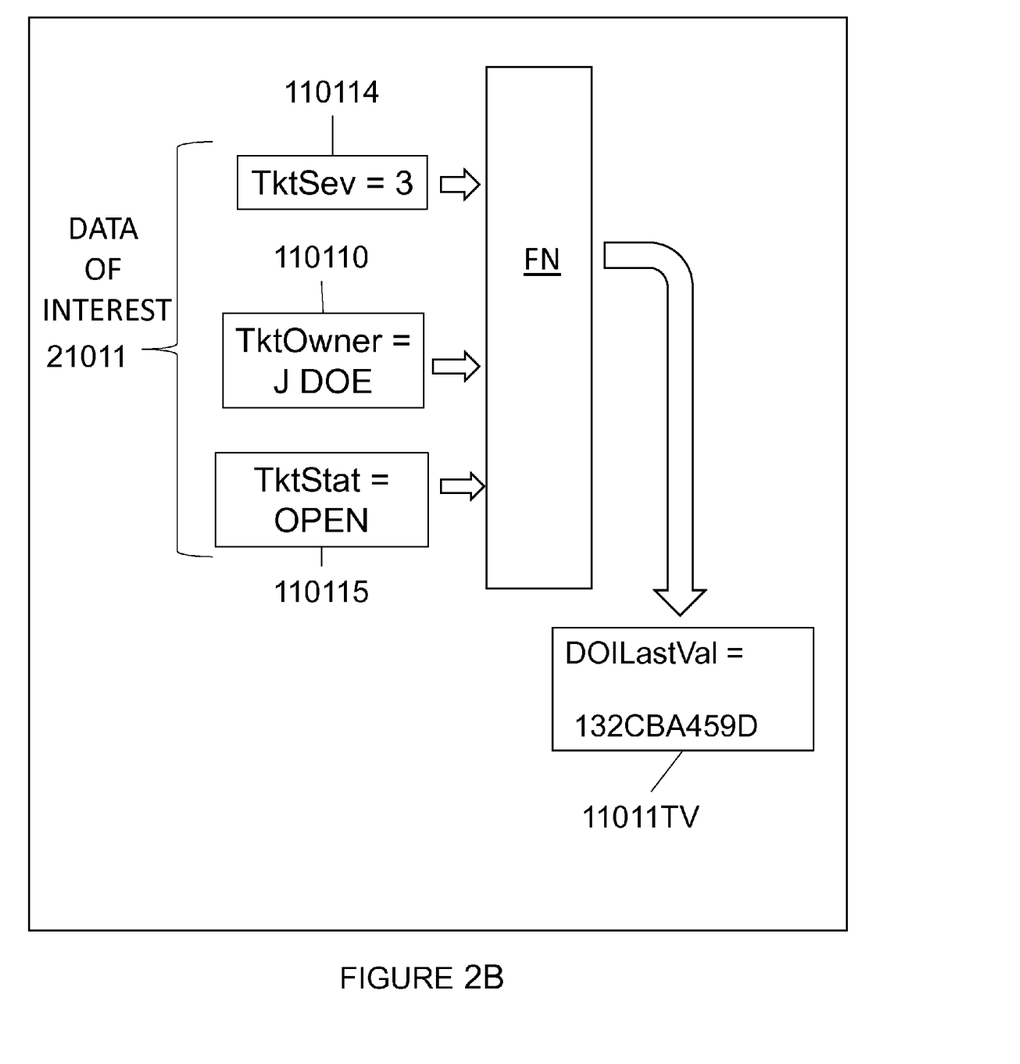
FIG. 2B illustrates an example of the generation of the initial value 11011TV depicted in FIG. 1.

FIG. 2A illustrates an example of problem ticket 11011 depicted in FIG. 1. By way of overview: exemplary problem ticket data fields 110009 . . . 110115 contain data applicable to problem ticket 11011; exemplary problem ticket data fields 110116 . . . 110119 contain data applicable to a related problem ticket created under a different problem ticketing application; and data field 11011TV contains a computed value, which is generated by the application of function FN (FIGS. 1, 2B) to a subset of the problem ticket data fields 110116 . . . 110119 identified as containing data of interest 21011 (FIGS. 1, 2B). The computed value is representative of data that is data of interest 21011 to a related problem ticket. As depicted in FIG. 2A, exemplary problem ticket data fields 110009 . . . 110115 applicable to problem ticket 11011 include: a problem identifier data field 110009 for storing data ( . . . ) identifying the problem (PrbID= . . . ) that is the subject of this support request; a problem ticket owner identifier data field 110110 for storing data ( . . . ) identifying the creator (TktOwner= . . . ) of this problem ticket; ticket identifier field 110111, for storing data ( . . . ) identifying this problem ticket (TktID= . . . ); ticket application identifier 110112 for storing data ( . . . ) identifying the ticketing application (TktAppName= . . . ) associated with this problem ticket; problem ticket system name data field 110113 for storing data ( . . . ) identifying a server (TktSysName= . . . ) associated with the ticketing application identified in ticket application identifier 110112; a problem ticket severity data field 110114 for storing data ( . . . ) identifying a severity level (TktSev= . . . ) associated with this problem ticket; and a problem ticket status data field 110115 for storing data ( . . . ) identifying the status (TktStat= . . . ) of this problem ticket. The problem ticket data fields depicted as applicable in this example to a related ticket include: a related ticket indicator data field 110116 for storing data ( . . . ) indicative of whether or not there are related problem ticket(s) (RmTkt= . . . ) associated with this problem ticket; a related ticket identifier data filed 110117 for storing data ( . . . ) identifying a related problem ticket (RmTktID= . . . ); a related ticket application name data field 110118 for storing data ( . . . ) identifying a related problem ticketing application (RmtTktAppName= . . . ); a remote ticket system name data field 110119 for storing data ( . . . ) identifying a server (RmTktSysName= . . . ) associated with an identified related problem ticket application 110118. The exemplary data fields also include data field 11011TV, for storing data ( . . . ) representative of data of interest 21011 (DOILastVal= . . . ) to a related problem ticket. Such representative data is sometimes referred to herein as a computed value, an initial value or a recently computed value. As will be discussed in more detail with reference to FIG. 2B, the computed value can be generated by the application of function FN to data of interest 21011 to a related problem ticket identified in related ticket identifier data field 110117.

FIG. 2B illustrates an example of the generation of a computed value associated with a problem ticket and is representative of data of interest to a related problem ticket. As depicted, data of interest data fields 21011 include problem ticket severity data field 110114 (depicted as containing a value of "3"), problem ticket owner identifier data field 110110 (depicted as containing a value of "J DOE") and problem ticket status data field 110115 (depicted as containing a value of "OPEN"). In this example, such data of interest data fields 21011 collectively correspond to a subset of the data fields 110116 . . . 110119 in problem ticket 11011 (FIG. 2A) that have been identified as containing DOI to a related problem ticket, such as is depicted as contained in data field 110117 (FIG. 2A,). With reference again to the example depicted in FIG. 2B, function FN (here, a checksum function) can be applied to the aforementioned data contained in the data of interest data fields 110114, 110110 and 110115. The checksum function generates a checksum value (referred to in this example as an initial value), depicted as contained in data field 11011TV (DOILastVal= . . . ) that is representative of the collective data of interest depicted as contained in the data of interest data fields 110114, 110110 and 110115.

Figure 3:
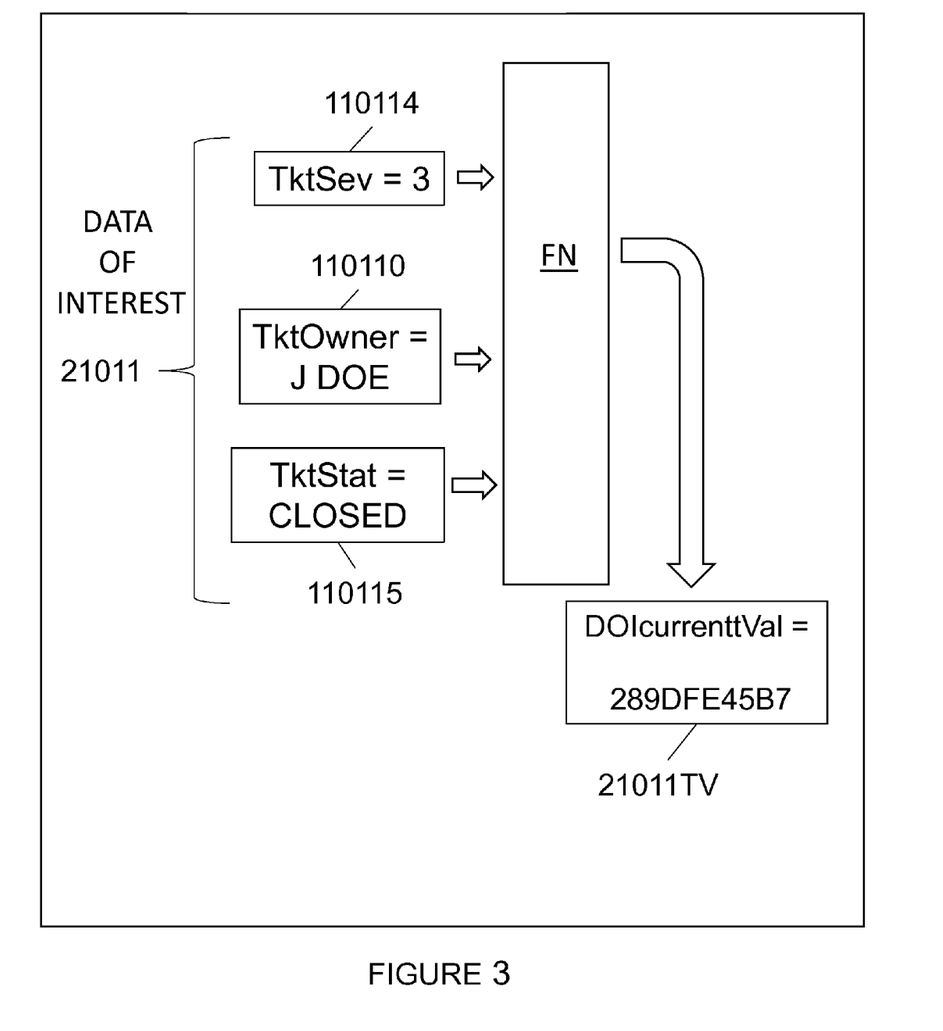
FIG. 3 illustrates an example of the generation of the current value 21011TV depicted in FIG. 1.

FIG. 3 illustrates another example of the generation of a computed value associated with data contained in a subset of data fields in a problem ticket. In this example, the computed value is representative of such data in an updated problem ticket and will be referred to as a current value. With reference to FIG. 3, data of interest data fields 21011 include: problem ticket severity data field 110114, depicted as containing a data value of "3"; problem ticket owner identifier data field 110110, depicted as containing a data value of "J DOE"); and problem ticket status data field 110115, depicted as containing a data value of "CLOSED"). Note that (in contrast to the example described with reference to FIG. 2A), the data value depicted as contained in ticket status data field 110115 of FIG. 3, indicates that problem ticket 11011 is now "CLOSED." With reference again to FIG. 3, function FN (the same checksum function described with reference to the example of FIG. 2B) is applied to the (now changed) data contained in the aforementioned DOI data fields 110114, 110110, and 110115. The application of the checksum function to the data contained in DOI data fields results in the generation of a current value (in this case a checksum) that is representative of the data. The current value is then stored in data field 21011TV as DOIcurrentVal= . . . .

Figure 4:
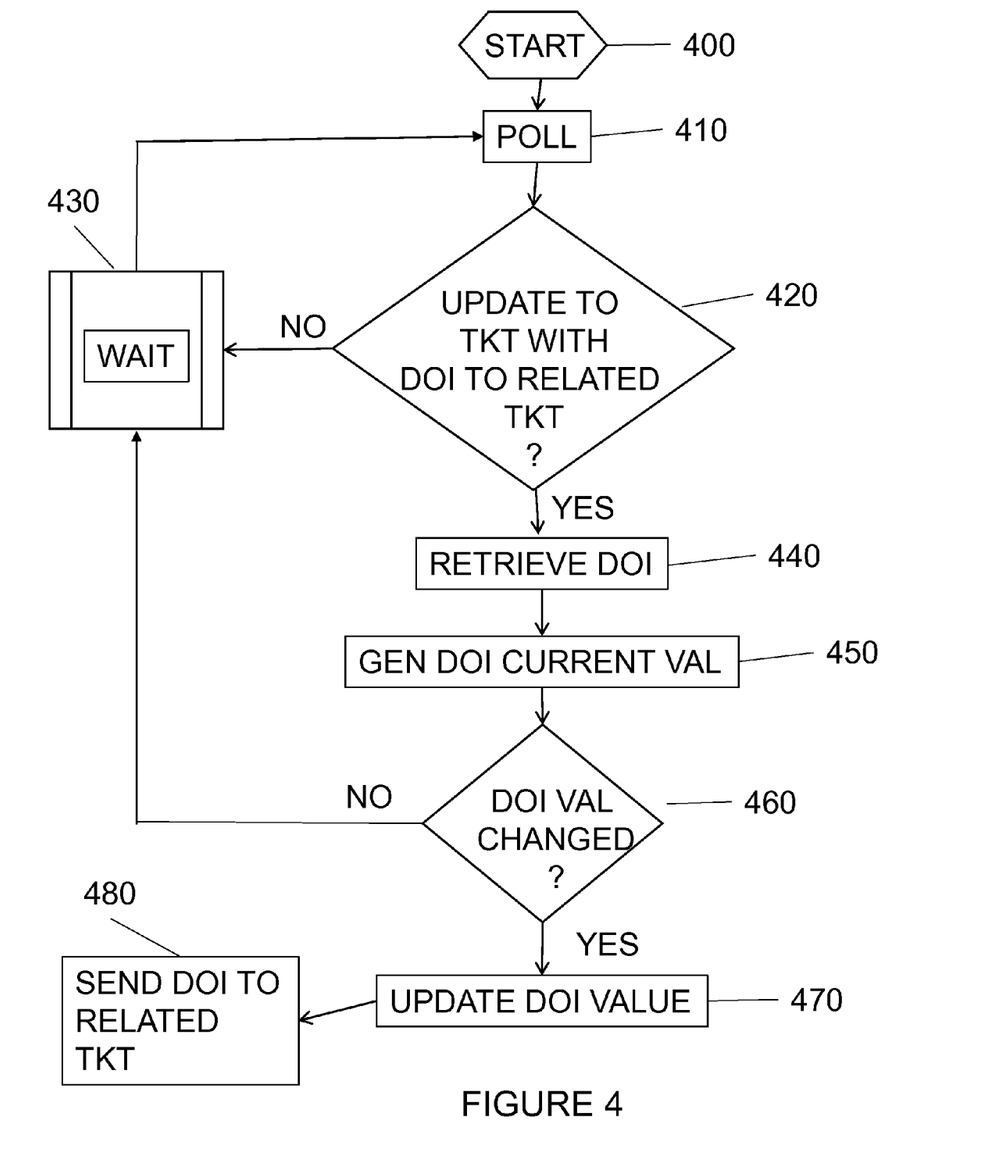
FIG. 4 illustrates an example of a computer-implemented process in accordance with the present invention.

FIG. 4 depicts an example of a computer-implemented process in accordance with the present invention. By way of introduction (with reference to FIG. 2A), we will assume that for purposes of this example: a problem ticket 11011 is initially opened on problem ticket application 1101 with severity of "3" as indicated in problem ticket severity data field 110114. We will also assume (with reference to FIG. 2A) that: the support group (not depicted) assigned to resolve such "severity 3" tickets has exhausted its available solutions and has determined that resolution of the underlying problem (indicated by the data value "OSS983" depicted as contained in problem identifier data field 110009 should be escalated to a higher "severity 2" status, which is handled by another support group. We will further assume for purposes of this example that that the "severity 2" support group uses a different problem ticket application "110n" (as depicted data field 11018) and that related problem ticket "110n1" (as depicted in data field 11018) has been opened with a severity status of "2" (not depicted). We will assume for purposes of this example that: data associated with related problem ticket 110n1 has been entered in data fields 110116 . . . 110119 (FIG. 2A) of problem ticket 11011; a subset of data field(s) in problem ticket 11011 (FIG. 2A) have been identified as containing data of interest 21011 (FIG. 1) to related problem ticket 110n1 have been populated (as depicted in data fields 110114, 110110 and 10115 (FIG. 2B); and function FN (a checksum function) has been applied to such data of interest to generate an initial value (as depicted in data field 11011TV).

Referring now to FIG. 4, the process begins at step 400 and proceeds to step 410. In step 410, ticket synch 102 problem ticket application manager initiates a conventional periodic poll/query of the problem ticketing applications 1101 . . . 110n (FIG. 1) under its management to identify e.g., via time stamps (not depicted) whether any record(s) associated with the corresponding underlying problem tickets (e.g., problem tickets 11011 . . . 1101x, created under problem ticketing application 1101) has changed since the previous poll. Upon completion of the poll, the process proceeds to step 420.

In step 420, if the query results indicate that no updates have been made since the previous poll/query was performed, the process proceeds to step 430. In some embodiments, the poll/query results can indicate more specifically that no updates to data of interest have been made since the previous poll/query was performed. By way of example only, with reference to FIG. 2A, related ticket indicator data field 110116 containing a value other than "YES" can be used to indicate that there is no related problem ticket and thus there can be no data values of interest, in which case the process proceeds to step 430.

In step 430, the poll/query enters a wait state, until the expiration of a predefined time interval, at which time the process returns to step 410. We will assume that prior to the expiration of the aforementioned time interval, the ticket status data field 110115 of problem ticket 11011 (depicted in data field 110115, FIG. 2B as "OPEN") has been changed to a "CLOSED" status (as depicted in data field 110115, FIG. 3). The predefined wait time interval subsequently expires and the process returns to step 410.

In step 410 (as noted above), problem ticketing applications 1101 . . . 110n are again polled/queried to determine e.g., whether any data updates have occurred since the previous poll and the process again proceeds to step 420.

In step 420, because of the aforementioned change in the status of problem ticket 11011 during the wait state discussed above with reference to step 430, the poll/query results now indicate that problem ticket 11011 has changed since the previous query was performed. In this example, updated problem ticket 11011 can be retrieved and information contained in data fields 110116 . . . 110119 (FIG. 2A) are examined to determine whether or not there is another problem ticket that is related to updated problem ticket 11011. For example, data fields (with reference to FIG. 2A) can be examined to identify: the existence of a related problem ticket, as indicated by the data value "YES" depicted as contained in the related ticket indicator data field 110116; the identifier of a related problem ticket, as indicated by the data value "110$n$1" depicted as contained in related ticket identifier data field 110117; the name of a related ticket application, as indicated by the value "110$n$" depicted as contained in data field 110118; and the name of a related ticket system, as indicated by the value "110$n$S" depicted as contained in data field 110119.

It should be understood that many variations of the foregoing example could be implemented within the spirit and scope of the invention. By way of example only, the related ticket indicator data field 110116 could be eliminated and replaced by an examination of the contents of the related ticket identifier data field 110117; and/or both fields retained and a different, predefined value used in data field 110117 to trigger alternative processing (not depicted) in addition to or in parallel with the inventive process. A non-exhaustive list of triggers for such alternative processing are that the other problem ticketing application is related (as indicated by the data value "Yes" depicted in data field 110116), but it is otherwise determined that (a) the related problem ticketing application is not different; or (b) the related problem ticketing application is different but is not updateable under the inventive process. With reference again to FIG. 4, the process proceeds from step 430 to step 440.

In step 440, ticket synch application 102 (FIG. 1) retrieves additional data associated with updated problem ticket 11011. Recall that in step 420, problem ticket 11011 was identified as an updated problem ticket (without specifics) via the poll/query performed in step 410. With reference now to step 440, the retrieved data includes the data values contained in DOI data fields 21011 (FIG. 3) of the updated problem ticket. As noted above, the retrieved data is also data of interest to related problem ticket 110$n$1. The process then proceeds to step 450.

In step 450, ticket synch application 102 (FIG. 1) applies the checksum function FN to the retrieved (in step 440) data of interest contained in DOI data fields 21011 (FIG. 3) of the updated problem ticket. The application in this step 450 of checksum function FN results in the generation of a current value, which is representative of the data of interest contained in DOI data fields 21011 (FIG. 3) of the updated problem ticket. The current value is depicted as contained in data field 21011TV (FIG. 3). The checksum function FN applied in this step 450, is the same checksum function previously described as applied to generate the initial value depicted in data field 11011TV (FIG. 2B). The process then proceeds to step 460.

In step 460, ticket synch 102 problem ticket application manager (FIG. 1) compares the initial value contained data field 11011TV of problem ticket 11011 (FIG. 2A) with the current value of the data of interest (computed in step 450) contained in data field 21011TV (FIG. 3) associated with updated problem ticket 11011.

If the results of the comparison indicate that the computed values are equal (i.e., not changed), the updates identified in step 420 to problem ticket 11011 are determined as not involving data of interest to related problem ticket 110$n$1 and process returns to step 430. If however, as in this example, the results of the comparison indicate that the computed values are not equal (i.e., have changed), the updates identified in step 420 to problem ticket 11011 are determined as involving data of interest to related problem ticket 110$n$1 and the process then proceeds to step 470.

In step 470, the current value (computed in step 450), depicted as contained in data field 21011TV (FIG. 3) of updated problem ticket 11011, overwrites (replaces) the initial value depicted as contained in data field 11011TV of problem ticket 11011 (FIG. 2A). As a result of the overwrite by the current value, the data contained in data field 11011TV of problem ticket 11011 again represents a most recently computed value of the data of interest 21011 to related problem ticket 110$n$1. The process then proceeds to step 480.

In step 480, ticket synch 102 problem ticket application manager confirms that the problem ticket updates identified in step 420 can be transmitted to remote ticket application 110$n$ via corresponding remote server 110$n$S (identified in respective data fields 110118 and 110119 of FIG. 2A) for mapping to the corresponding fields of related problem ticket 110$n$1 (identified in RmTktID data field 110117, FIG. 2A). In some embodiments, only the retrieved (in step 440) data of interest is transmitted. In either case, the mapping can be performed after transmission, by conventional field mapping components (driven by XML files)—not depicted, to facilitate the corresponding ticketing system drivers' (1051 . . . 105$n$) ability to work with the problem data/fields in the applicable native driver format.

Thus, some embodiments of the present invention can improve system throughput by coordinating data updates to records created under different applications without having to do a full comparison of all data fields in a problem ticket to identify what data has changed. Some embodiments of the present invention can also reduce unnecessary network traffic by determining—before communicating the data updates—that a particular data update contains DOI to a record created under one or more such different applications.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Some aspects, examples and/or embodiments of the present invention are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the operations/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have illustrated examples of architecture, functionality, and the operation of various embodiments of devices, methods, and computer program products. In this regard, each block in the flowchart or block diagrams may represent a module, segment, or portion of computer executable instructions for implementing the corresponding logical operation(s). It is understood that the operations noted in a given block (or step) may occur in a different order from the examples described in the Detailed Description and Drawings. For example, two blocks shown in succession may, in fact, be executed substantially concurrently (and vice versa), or the blocks may sometimes be executed in the reverse order, depending upon the functionality involved. It is also understood that a block (and/or combination of blocks) of the block diagrams and/or flowcharts can be implemented by special purpose hardware-based systems and/or combinations of such hardware with computer instructions that perform the specified operations or process steps.

The descriptions of the various aspects, examples and embodiments of the present invention are not intended to be exhaustive or limited to that disclosed. Many modifications and variations will be apparent to those of ordinary skill in the art without departing from the scope and spirit of such descriptions. The terminology used herein was chosen to best explain the principles of the aspects, examples and embodiments, the practical application or technical improvement over technologies found in the marketplace, or to enable others of ordinary skill in the art to understand the aspects, examples and embodiments disclosed.

What is claimed is:

1. A computer-implemented method for managing one or more data updates to computer programs, said computer-implemented method comprising:
   identifying a subset of data fields associated with a record created under a first computer program that contain data values of interest to another record created under a different computer program;
   computing an initial value based on an application of a function to said data values of interest, wherein said initial value is representative of said data values of interest and storing the initial value in a memory associated with said record;
   monitoring said computer programs for said one or more data updates and identifying said record as an updated record containing said one or more data updates;
   computing a current value based on the application of the function to said data values of interest associated with said updated record, wherein said current value is representative of said data values of interest associated with said updated record;
   comparing the current value with the initial value and determining that the current value and the initial value are not equal;
   storing the current value as the initial value in said memory associated with said record, in response to said determining that the current value and the initial value are not equal; and
   communicating said data values of interest associated with said updated record to said another record, in response to said determining that the current value and the initial value are not equal.

2. The computer-implemented method of claim 1, wherein said communicating said data values of interest associated with said updated record to said another record, further comprises communicating said data values of interest associated with said updated record over a network to said another record, in response to said determining that the current value and the initial value are not equal.

3. The computer-implemented method of claim 1, further comprising: providing a centralized computer program manager, wherein said computer-implemented method is performed by the centralized computer program manager.

4. The computer-implemented method of claim 3, wherein the centralized computer program manager is a problem ticketing application manager, the computer program is a problem ticketing application, the different computer program is a different problem ticketing application, said record is a problem ticket created under the problem ticketing application, and said another record is a another problem ticket created under the different problem ticketing application.

5. The computer-implemented method of claim 1, wherein said monitoring said computer programs for said one or more data updates further comprises monitoring said computer programs for said one or more data updates at predefined time intervals.

6. The computer-implemented method of claim 1, wherein the function is a checksum function.

7. A computer program product for managing one or more data updates to computer programs, the computer program product comprising a computer-readable storage medium having program code embodied therewith, wherein the computer readable storage medium is not a transitory signal per se, the program code executable by at least one processor to cause the electronic device to perform a computer-implemented method comprising:
   identifying a subset of data fields associated with a record created under a first computer program that contain data values of interest to another record created under a different computer program;
   computing an initial value based on an application of a function to said data values of interest, wherein said initial value is representative of said data values of interest and storing the initial value in a memory associated with said record;
   monitoring said computer programs for said one or more data updates and identifying said record as an updated record containing said one or more data updates;
   computing a current value based on the application of the function to said data values of interest associated with said updated record, wherein said current value is representative of said data values of interest associated with said updated record;
   comparing the current value with the initial value and determining that the current value and the initial value are not equal;
   storing the current value as the initial value in said memory associated with said record, in response to said determining that the current value and the initial value are not equal; and
   communicating said data values of interest associated with said updated record to said another record, in response to said determining that the current value and the initial value are not equal.

8. The computer program product of claim 7, wherein said communicating said data values of interest associated with said updated record to said another record further comprises, communicating said data values of interest associated with said updated record over a network to said another record, in response to sad determining that the current value and the initial value are not equal.

9. The computer program product of claim 7, further comprising:
   providing a centralized computer program manager, wherein said computer-implemented method is performed by the centralized computer program manager.

10. The computer program product of claim 9, wherein the centralized computer program manager is a problem ticketing application manager; the computer program is a problem ticketing application, the different computer program is a different problem ticketing application, sad record is a problem ticket created under the problem ticketing application, and said another record is a another problem ticket created under the different problem ticketing application.

11. The computer program product of claim 7, wherein said monitoring said computer programs for said one or more data updates further comprises monitoring said computer programs for said one or more data updates at predefined time intervals.

12. The computer program product of claim 7, wherein the function is a checksum function.

13. A computer system for managing one or more data updates to computer programs, wherein a subset of data fields associated with a record created under a computer program are identified as containing data values of interest to another record created under a different computer program, said computer system comprising:
   at least one processor;
   a memory coupled to the processor, said memory storing computer program code executable on the processor to cause the computer system to perform a computer-implemented method comprising:

computing an initial value based on an application of a function to said data values of interest, wherein said initial value is representative of said data values of interest and storing said initial value in a data field associated with said record;

monitoring said computer programs for said one or more data updates and identifying said record as an updated record containing said one or more data updates;

computing a current value based on the application of the function to said data values of interest associated with said updated record, wherein said current value is representative of said data values of interest associated with said updated record;

comparing the current value to the initial value and determining that the current value and the initial value are not equal;

storing the current value as the initial value in said memory associated with said record, in response to said determining that the current value and the initial value are not equal; and communicating said data values of interest associated with said updated record to said another record, in response to said determining that the current value and the initial value are not equal.

14. The computer system of claim 13, wherein said communicating said data values of interest associated with said updated record to said another record further comprises, communicating said data values of interest associated with said updated record over a network to said another record, in response to said determining that the current value and the initial value are not equal.

15. The computer system of claim 13, further comprising a centralized computer program manager coupled to the computer program and the different computer program, wherein said computer program manager is configured to perform said computer-implemented method.

16. The computer system of claim 15, wherein the centralized computer program manager is a problem ticketing application manager, the computer program is a problem ticketing application, the different computer program is a different problem ticketing application, said record is a problem ticket created under the problem ticketing application, and said another record is another problem ticket created under the different problem ticketing application.

17. The computer system of claim 13, wherein said monitoring said computer programs for said one or more data updates further comprises monitoring said computer programs for said one or more data updates at predefined time intervals.

18. The computer system of claim 13, wherein the function is a checksum function.

* * * * *